United States Patent
Niemelä

(10) Patent No.: US 10,282,545 B2
(45) Date of Patent: May 7, 2019

(54) DETECTION OF MALWARE-USABLE CLEAN FILE

(71) Applicant: F-Secure Corporation, Helsinki (FI)

(72) Inventor: Jarno Niemelä, Kirkkonummi (FI)

(73) Assignee: F-Secure Corporation, Helsinki (FI)

( * ) Notice: Subject to any disclaimer, the term of this patent is extended or adjusted under 35 U.S.C. 154(b) by 30 days.

(21) Appl. No.: 15/421,930

(22) Filed: Feb. 1, 2017

(65) Prior Publication Data

US 2017/0220800 A1    Aug. 3, 2017

(30) Foreign Application Priority Data

Feb. 2, 2016 (GB) .................................. 1601844.2

(51) Int. Cl.
| | | |
|---|---|---|
| G06F 21/56 | (2013.01) | |
| G06F 16/245 | (2019.01) | |
| G06F 17/30 | (2006.01) | |
| G06F 21/57 | (2013.01) | |
| H04L 29/06 | (2006.01) | |

(52) U.S. Cl.
CPC .......... G06F 21/565 (2013.01); G06F 16/245 (2019.01); G06F 17/30424 (2013.01); G06F 21/577 (2013.01); H04L 63/1416 (2013.01); H04L 63/1433 (2013.01); G06F 2221/034 (2013.01)

(58) Field of Classification Search
CPC ........ G06F 21/55–21/552; G06F 21/56; G06F 21/564–21/565; G06F 21/577; G06F 2221/033–2221/034; H04L 63/1416; H04L 63/1433
See application file for complete search history.

(56) References Cited

U.S. PATENT DOCUMENTS

| | | | |
|---|---|---|---|
| 5,822,517 A | 10/1998 | Dotan | 395/186 |
| 6,185,689 B1 * | 2/2001 | Todd, Sr. | G06F 21/577 705/53 |
| 8,201,257 B1 | 6/2012 | Andres et al. | 726/25 |
| 9,058,492 B1 * | 6/2015 | Satish | G06F 21/50 |
| 9,158,915 B1 | 10/2015 | Yumer et al. | 726/13 |
| 2004/0003321 A1 * | 1/2004 | Glew | G06F 21/57 714/27 |
| 2005/0229250 A1 * | 10/2005 | Ring | G06F 21/57 726/23 |
| 2015/0096018 A1 | 4/2015 | Mircescu | 726/23 |
| 2015/0163242 A1 * | 6/2015 | Laidlaw | G06F 21/552 726/22 |
| 2015/0180890 A1 * | 6/2015 | Ronen | H04L 63/1416 726/23 |

FOREIGN PATENT DOCUMENTS

WO    WO 2016/048541 A1    3/2016

* cited by examiner

*Primary Examiner* — Kevin Bechtel
(74) *Attorney, Agent, or Firm* — Harrington & Smith

(57) ABSTRACT

There are provided measures for enabling the detection of a malware-usable clean file or, stated differently, the detection of malware using a clean file. Such measures could exemplarily include identifying a vulnerable clean file in a computer system, which does not constitute malware but is vulnerable for usage by malware, checking the vulnerable clean file for its threat of usage by malware, and detecting the vulnerable clean file as malware-usable clean file on the basis of a result of said checking of its threat of usage by malware.

19 Claims, 4 Drawing Sheets

DETECTION OF MALWARE-USABLE CLEAN FILE

FIELD

The present invention relates to the detection of a malware-usable clean file in a computer system. More specifically, the present invention relates to measures (including methods, apparatuses and computer program products) for enabling the detection of a malware-usable clean file or, stated differently, the detection of malware using a clean file.

BACKGROUND

In computer systems, including any kind of computer systems in electronic devices such as computers, smartphones, tablets, control equipment or the like, security is a vital issue. One of the most common security attacks are based on malware which is brought into the computer system by an attacker, and which can execute various kinds of malicious operations in the computer system, if not detected and disinfected.

For detecting such malware, malware scanning software and/or hardware is commonly available. Yet, such malware scanning software and/or hardware is typically capable of identifying malware files as such only. That is, such malware scanning software and/or hardware is typically not capable of identifying malware when the malware makes use of an inherently clean file (i.e. a file which as such does not constitute malware) for its malicious purposes.

This is for example the case when an advanced persistent threat (APT) and common malware uses a clean file as launch mechanism for itself or for sandbox escape. What the malware does is that a vulnerable clean (executable) file such as a driver or other component is transported to and dropped in the targeted computer system. Then, the malware executes this vulnerable clean (executable) file with payload that takes over the process of the vulnerable clean (executable) file, and thereby inserts malware into the clean process. Typically, this trick is used for "fileless" autostart so that the malware payload exists as registry key which launches the vulnerable clean (executable) file such as the driver or other component and makes use of it by utilizing its vulnerability known by the attacker. Such kind of threat based on usage of a clean file as malware or, stated differently, malware using a clean file cannot be detected and/or prevented by conventional malware scanning software and/or hardware, basically because the inherently clean file cannot be detected as malware or malware-usable.

Accordingly, there is a need for enabling the detection of a malware-usable clean file or, stated differently, the detection of malware using a clean file.

SUMMARY

Various exemplifying embodiments of the present invention aim at addressing at least part of the above issues and/or problems.

Various aspects of exemplifying embodiments of the present invention are set out in the appended claims.

According to an example aspect of the present invention, there is provided a method comprising identifying a vulnerable clean file in a computer system, which does not constitute malware but is vulnerable for usage by malware, checking the vulnerable clean file for its threat of usage by malware, and detecting the vulnerable clean file as malware-usable clean file on the basis of a result of said checking of its threat of usage by malware.

According to an example aspect of the present invention, there is provided an apparatus comprising a memory configured to store computer program code and a processor configured to read and execute computer program code stored in the memory wherein the processor is configured to cause the apparatus to perform: identifying a vulnerable clean file in a computer system, which does not constitute malware but is vulnerable for usage by malware, checking the vulnerable clean file for its threat of usage by malware, and detecting the vulnerable clean file as malware-usable clean file on the basis of a result of said checking of its threat of usage by malware.

According to an example aspect of the present invention, there is provided an apparatus comprising means for identifying a vulnerable clean file in a computer system, which does not constitute malware but is vulnerable for usage by malware, means for checking the vulnerable clean file for its threat of usage by malware, and means for detecting the vulnerable clean file as malware-usable clean file on the basis of a result of said checking of its threat of usage by malware.

According to further developments and/or modifications of any one of the aforementioned example aspects of the present invention, for example, one or more of the following can apply:

- the checking may comprise verifying reputation information of the vulnerable clean file, wherein the checking results in a high threat of usage by malware when information indicative of a bad and/or malicious reputation is recognized,
- the checking may comprise verifying presence and/or registration of a device associated with the vulnerable clean file in the computer system, wherein the checking results in a high threat of usage by malware when no device associated with the vulnerable clean file is recognized,
- the checking may comprise verifying launchpoint and/or configuration information of the vulnerable clean file, wherein the checking results in a high threat of usage by malware when unusual launchpoint and/or configuration information is recognized,
- the checking may comprise verifying installation information of installation of the vulnerable clean file in the computer system, wherein the checking results in a high threat of usage by malware when an anomaly in installation information is recognized,
- the checking may comprise verifying expected state of presence of the vulnerable clean file in the computer system, wherein the checking results in a high threat of usage by malware when a mismatch between an actual state of presence of the vulnerable clean file and a nominal state of presence of the vulnerable clean file is recognized,
- updating reputation information of vulnerable clean files known in the computer system on the basis of a result of any verification,
- the result of the checking may be derived on the basis of one or more of available threat indications for the vulnerable clean file resulting from one or more of performed verifications,
- testing a file for being malware, wherein the file is identified as clean file when said testing results in that the file does not constitute malware, testing a clean file for being vulnerable, wherein the clean file is identified as vulnerable clean file when said testing results in that the clean file is vulnerable for usage by malware, the vulnerable clean file may be an executable file such as a device driver, a device driver component or another executable file component.

the verifying, checking and detection operations may be executed either when the vulnerable clean file is being input or installed in the computer system, or upon initiation by a user or process of the computer system, or upon detection of a predefined event or situation, or on a regular basis, the verifying, checking and detection operations may be executed by malware scanning software and/or hardware mounted in the computer system or an external security provider system.

According to an example aspect of the present invention, there is provided a computer program product, comprising computer-executable computer program code which, when the computer program code is executed on a computer (such as or included in an apparatus according to any one of the aforementioned apparatus-related example aspects of the present invention), is configured to cause the computer to carry out a method according to the aforementioned method-related example aspect of the present invention, including any developments and/or a modifications thereof.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned example aspects of the present invention are set out herein with reference to the drawings and exemplifying embodiments of the present invention.

By way of exemplifying embodiments of the present invention, the detection of a malware-usable clean file or, stated differently, the detection of malware using a clean file in a computer system is enabled. Thereby, threats based on usage of a clean file as malware or, stated differently, malware using a clean file can be detected and prevented.

BRIEF DESCRIPTION OF THE DRAWINGS

In the following, the present invention will be described in greater detail by way of non-limiting examples with reference to the accompanying drawings, in which.

DETAILED DESCRIPTION

Figure 1:
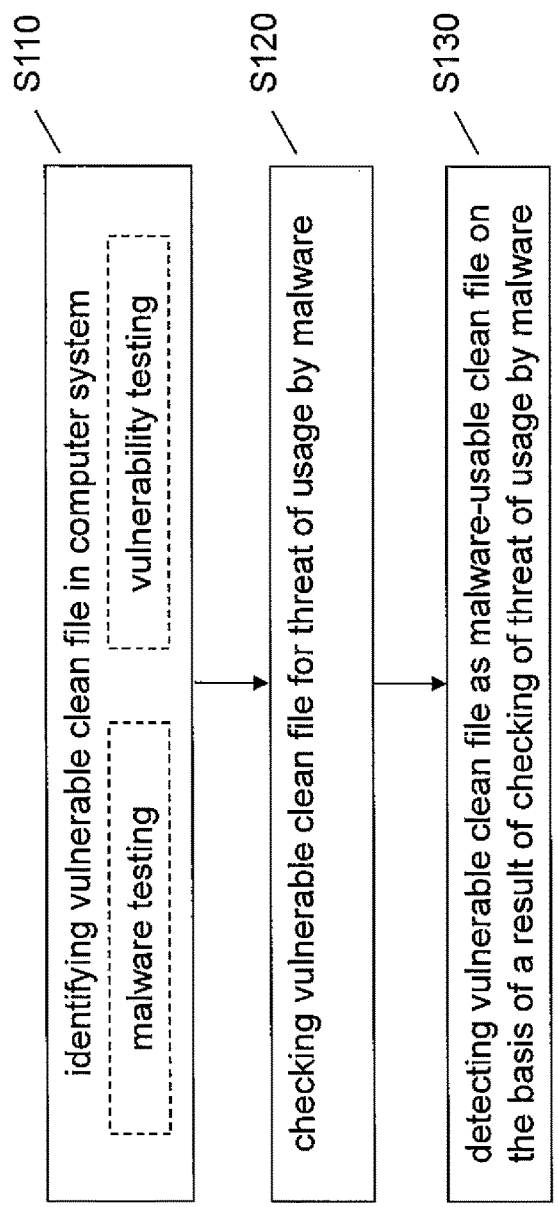
FIG. 1 shows a flowchart illustrating an example of a method of detecting a malware-usable clean file according to exemplifying embodiments of the present invention.

The present invention is described herein with reference to particular non-limiting examples and to what are presently considered to be conceivable embodiments of the present invention. A person skilled in the art will appreciate that the present invention is by no means limited to these examples, and may be more broadly applied.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for enabling the detection of a malware-usable clean file or, stated differently, the detection of malware using a clean file in a computer system.

Herein, in general, a clean file refers to a computer file which as such does not constitute malware, and a vulnerable file to a computer file which as such is vulnerable for usage by malware. Accordingly, a vulnerable clean refers to a computer file which does not constitute malware but is vulnerable for usage by malware. In this regard, usage by malware actually refers to misusage or abuse of the file by malware for its malicious purposes, e.g. as launch mechanism or for a sandbox escape. As outlined above, such malware-usable vulnerable clean refers can be utilized for an APT or common malware attack, but cannot be detected and/or and disinfected by conventional malware scanning software and/or hardware. Such vulnerable clean file can be an executable file such as a device driver, a device driver component or another executable file component.

FIG. 1 shows a flowchart illustrating an example of a method of detecting a malware-usable clean file according to exemplifying embodiments of the present invention.

As shown in FIG. 1, a method according to exemplifying embodiments of the present invention comprises an operation (S110) of identifying a vulnerable clean file in a computer system, an operation (S120) of checking the vulnerable clean file for its threat of usage by malware, and an operation (S130) of detecting the vulnerable clean file as malware-usable clean file on the basis of a result of said checking of its threat of usage by malware. Accordingly, the checking and detecting operations according to exemplifying embodiments of the present invention are applied to a vulnerable clean file in a computer system. Details of the checking and detecting operations according to exemplifying embodiments of the present invention are explained below with reference to FIGS. 2 and 3.

As shown in FIG. 1, an operation of identifying a vulnerable clean file in a computer system according to exemplifying embodiments of the present invention may comprise an operation of malware testing and/or an operation of vulnerability testing. Here, malware testing refers to an operation of testing a file for being malware, wherein the file is identified as clean file when said testing results in that the file does not constitute malware, and vulnerability testing refers to an operation of testing a clean file for being vulnerable, wherein the clean file is identified as vulnerable clean file when said testing results in that the clean file is vulnerable for usage by malware.

The aforementioned malware testing can be accomplished in any conceivable way suitable for identifying a file as malware. For example, a file can be identified to be malware by behavioral analysis or file analysis. Behavioral analysis can be any analysis as to whether the file does something that a clean file does typically not does or is even not allowed to do. File analysis can be any reading and/or studying of the file with some technique that allows to differentiate between clean and malicious files, including e.g. simple signature scan, file property analysis, machine learning, or the like.

The aforementioned vulnerability testing can be accomplished in any conceivable way suitable for identifying a file as clean but vulnerable file. It is to be noted that a vulnerable file does not constitute malware as such. For example, vulnerable files can be detected by comparing a hash value of the file (e.g. the file's SHA-256 hash) against a related database entry in a database of known vulnerable files.

Generally, it is to be noted that not any clean file is vulnerable as such, but that vulnerability in the meaning of the present invention represents a specific condition/property which a clean file can but must not exhibit.

Specifically, a clean file can exhibit vulnerability, where being "vulnerable" means that the file has a programming peculiarity (e.g. error) that an attacker can benefit from (after introduction, storage or installation of this file in a subject system).

It is to be noted that exemplifying embodiments of the present invention are basically directed to identify malware vulnerability of a file based on its specific characteristic and/or behavior which suggests that it is exploited by APT or malware. This is a special case where the attacker introduces the vulnerable file to the system in order to benefit from its specific vulnerability. Although inherently clean files are introduced and used by APT or malware, these files can be identified as dangerous because of their peculiarity of being malware-vulnerable as well as certain properties, such as that it was not there before the malware. To this end, those vulnerable clean files are to be detected, which are somehow "out of place" so that they have no valid reason to be in the system as they are. Hence, it can be figured out that and potentially also why a vulnerable file is in the system.

Although not shown in FIG. 1, it is to be understood that the detection of the vulnerable clean file as malware-usable clean file can be used as a basis for further operation. For example, automatic malware disinfection can be triggered, manual malware disinfection can be prompted, or the like.

According to exemplifying embodiments of the present invention, a method of detecting a malware-usable clean file, as illustrated in FIG. 1, can be executed by accordingly configured malware scanning software and/or hardware mounted in the computer system or an external security provider system. Further, a method of detecting a malware-usable clean file, as illustrated in FIG. 1, can be executed before, during or after storage or installation thereof in the computer system. More specifically, such malware-usable clean file detection can be executed either when the vulnerable clean file is being input or installed in the computer system, or upon initiation by a user or process of the computer system, or upon detection of a predefined event or situation, or on a regular (temporal) basis. This may depend on the kind of specific operations (e.g. verifications) to be performed, as some of those are applicable even for files not already installed or stored, while others of those are applicable only for already installed or stored files, as will be understood by a skilled person from the subsequent description of such specific operations (e.g. verifications).

Figure 2:
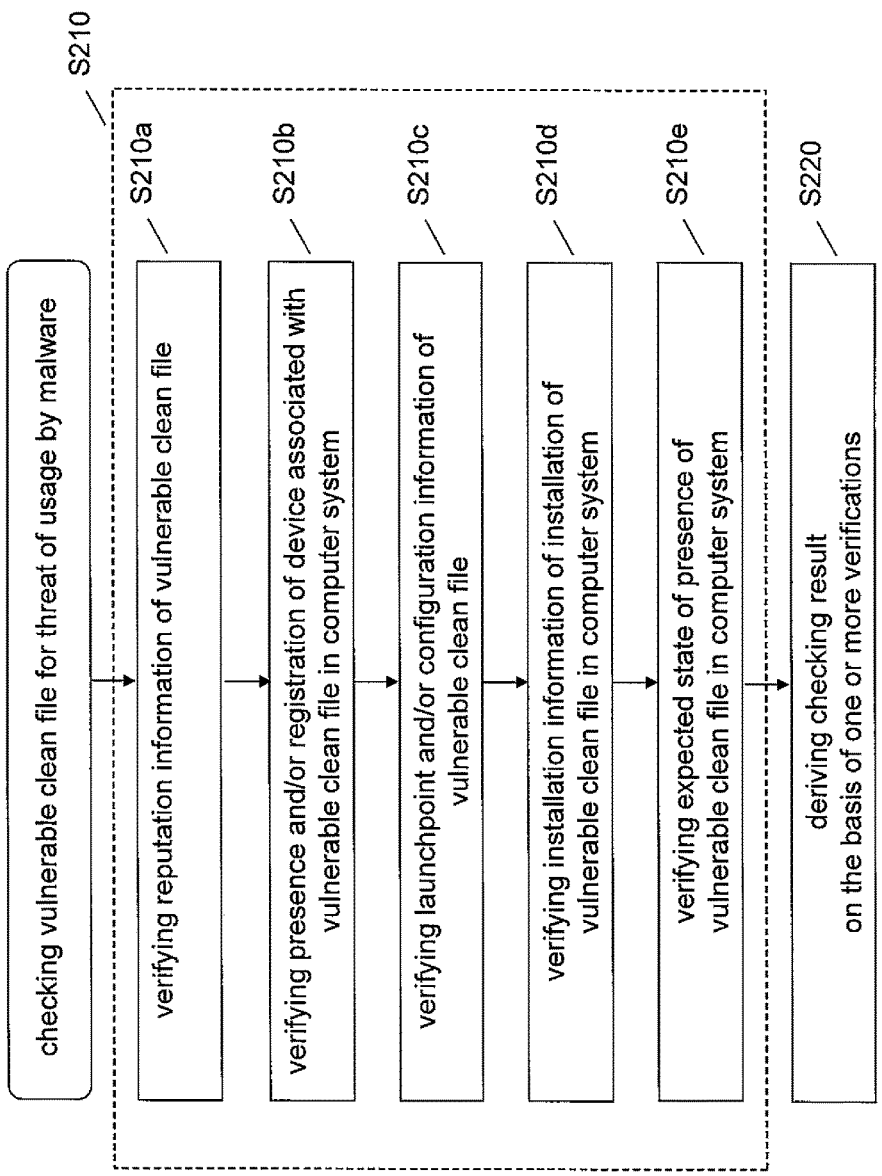
FIG. 2 shows a flowchart illustrating an example of a process of checking usage-by-malware threat of a vulnerable clean file according to exemplifying embodiments of the present invention.

FIG. 2 shows a flowchart illustrating an example of a process of checking usage-by-malware threat of a vulnerable clean file according to exemplifying embodiments of the present invention.

As shown in FIG. 2, an example of a process of checking usage-by-malware threat of a vulnerable clean file according to exemplifying embodiments of the present invention (corresponding to the checking operation in the method illustrated in FIG. 1) comprises an operation (S210) of verifying one or more properties of the vulnerable clean file, which could be indicative of its threat of usage by malware (i.e. one or more verifications), and an operation (S220) of deriving a checking result to be used in the detecting operation in the method illustrated in FIG. 1.

A first exemplary verification comprises an operation (S210a) of verifying reputation information of the vulnerable clean file. This verification can be performed by querying reputation information of vulnerable clean files known in the computer system (e.g. in a reputation information database maintained in the computer system). Such reputation information may be available for any vulnerable clean file which is already known in the computer system, and may be indicative of a bad/malicious reputation or a good/trustworthy reputation of any known vulnerable clean file. Accordingly, based on such verification (reputation analysis), the checking results in (an indication of) a high threat of usage by malware when reputation information indicative of a bad and/or malicious reputation is recognized for the vulnerable clean file under verification, and (an indication of) a low threat of usage by malware when reputation information indicative of a good and/or trustworthy reputation is recognized for the vulnerable clean file under verification.

A second exemplary verification comprises an operation (S210b) of verifying presence and/or registration of a device associated with the vulnerable clean file in the computer system. This verification can be performed by querying any one of log, diagnostic and hardware information of an operating system of the computer system (e.g. in an operating system (OS) information database maintained in the computer system). Based on such verification (associated device presence/registration determination), the checking results in (an indication of) a high threat of usage by malware when no device associated with the vulnerable clean file is recognized for the vulnerable clean file under verification, and (an indication of) a low threat of usage by malware when a device associated with the vulnerable clean file is recognized for the vulnerable clean file under verification.

This verification is based on the following facts and considerations. Typically, (several types of) executable files are (intrinsically or functionally) associated with a device of the computer system, which applies e.g. for drivers, driver components, or the like. Such device of the computer system may by a structural part thereof (e.g. a graphics board, or the like) or a connectable/replaceable external or periphery element (e.g. a portable mass storage, a monitor, or the like). For example, if there is a driver in the system, there is—or should be—a device that the driver controls. Or at least, if the device is not currently present, it should already have been present and should thus be registered in the system. That is to say, the information about the device is—or should be—visible in OS information including OS history information, such as any one of log, diagnostic and hardware information of an operating system information. For example, in Windows®, logs, diagnostic and hardware enumeration functions contain a lot of information about devices that are or have once been connected. That is the reason why you can insert and remove e.g. USB devices, and as long as you put them back in the same port Windows® will not do hardware discovery and will automatically load the correct driver. Thus, in exemplifying embodiments of the present invention, such OS information including OS history information can be utilized to detect that the vulnerable clean file under verification is a driver associated with certain hardware ID (or certain device), but the actual hardware (or device) had never been connected to the computer system, when there are no corresponding traces in this information. If so, it is likely that the vulnerable clean file under verification is initiated by an attacker and intended to be used by malware, and (an indication of) a high threat of usage by malware can be assigned thereto.

A third exemplary verification comprises an operation (S210c) of verifying launchpoint and/or configuration information of the vulnerable clean file. This verification can be performed by querying registry information of the computer system (e.g. in a registry or registry information database maintained in the computer system). Based on such verification (launchpoint/configuration usualness testing), the checking results in (an indication of) a high threat of usage by malware when unusual launchpoint and/or configuration information is recognized for the vulnerable clean file under verification, and (an indication of) a low threat of usage by malware when usual launchpoint and/or configuration information is recognized for the vulnerable clean file under verification.

This verification is based on the following facts and considerations. Typically, in the registry or registry information, launchpoint and/or configuration information for a given file such as a driver is identical in/for every device or, at most, varies in a given range. Thus, in exemplifying embodiments of the present invention, the launchpoint and/or configuration information in the registry or registry information can be utilized to detect whether or not it is usual for the vulnerable clean file under verification. For example, if the launchpoint information of a driver is unusually long, it is likely that the driver under verification is initiated by an attacker and intended to be used by malware, and (an indication of) a high threat of usage by malware can be assigned thereto.

For example, a launchpoint for vmtoolsd.exe in the Windows® registry could look like this:
[HKEY_LOCAL_MACHINE\SOFTWARE\Microsoft\Windows\CurrentVersion\Run]"VMware User Process"="\"C:\\Program Files\\VMware\\VMware Tools\\vmtoolsd.exe\" -n vmusr"

Typically, in a clean file, the launchpoint for vmtoolsd.exe will always look the same. If it is different, someone or something has modified the launchpoint. It can be especially suspicious, if the launchpoint is very long, because that will mean that there is some data included, which is typically not there, and this additional data can likely be malware payload.

Accordingly, such anomaly in launchpoint information is considered suspicious by itself such that a thus modified launchpoint could be used as an indication of a clean, yet vulnerable file, i.e. (an indication of) a high threat of usage by malware.

A fourth exemplary verification comprises an operation (S210d) of verifying installation information of installation of the vulnerable clean file in the computer system. This verification can be performed by querying ecosystem information for file installation in the computer system (e.g. in an ecosystem information database maintained in the computer system). Herein, the term "ecosystem" generally refers the subject computer system as a whole (namely, the computer system is regarded as an "ecosystem") such that ecosystem information generally includes any system-related information as such. Based on such verification (installation information anomaly diagnosing), the checking results in (an indication of) a high threat of usage by malware when an anomaly in installation information is recognized for the vulnerable clean file under verification, and (an indication of) a low threat of usage by malware when no anomaly in installation information is recognized for the vulnerable clean file under verification.

This verification is based on the following facts and considerations. Typically, (several types of) executable files are not provided (e.g. input, installed or stored) in a computer system on their own, without any accompanying measures, which applies e.g. for drivers, driver components, or the like. For example, a driver file does not just appear in the system. Rather, when a driver is installed for hardware, or downloaded e.g. from Windows® update, there are several signs on clean installation thereof. Such signs on clean installation thereof may comprise one or more of presence of information in a (e.g. Windows®) installation log, presence of uninstall information, presence of accompanying configuration, installation at a fixed location in the directory structure, and/or component files, presence of corresponding registry settings, or the like. Such signs are derivable from the so-called ecosystem information for file installation in the computer system. Thus, in exemplifying embodiments of the present invention, the ecosystem information for file installation in the computer system can be utilized to detect whether or not installation of the vulnerable clean file under verification exhibits anomaly. For example, if there is only the driver file present at an unusual location in the directory structure and/or other component files are missing and/or signs of typical installation and registry settings are missing, it is likely that the vulnerable clean file under verification is initiated by an attacker and intended to be used by malware, and (an indication of) a high threat of usage by malware can be assigned thereto.

A fifth exemplary verification comprises an operation (S210e) of verifying expected state of presence of the vulnerable clean file in the computer system. This verification can be performed by querying installation and/or security log information for the vulnerable clean file (e.g. in an installation and/or security log information database maintained in the computer system). Based on such verification (file presence state testing), the checking results in (an indication of) a high threat of usage by malware when a mismatch between an actual state of presence of the vulnerable clean file and a nominal state of presence of the vulnerable clean file is recognized, and (an indication of) a low threat of usage by malware when a match between an actual state of presence of the vulnerable clean file and a nominal state of presence of the vulnerable clean file is recognized.

This verification is based on the following facts and considerations. Typically, the computer system holds installation and/or security log information which (among others) indicate whether or not a specific file should be present (e.g. installed) in the computer system. For example, if a file has been detected as being malware and/or vulnerable and a security update has been run, which included to de-install, disinfect, delete, replace, etc. this file, the installation and/or security log information indicate that this file should no longer be present in the computer system, since it is expected to be de-installed, disinfected, deleted, replaced, etc. by the security update. Accordingly, if this file is detected to be present (as its actual state of presence), the information on the nominal non-presence of this file (as its nominal state of presence) would lead to a mismatch. That is, the file is present while the installation and/or security log information points defines that the file should have been non-present, e.g. due to the previously run security update. This indicates that the computer system has already been patched, e.g. by a system administrator, but the file (including e.g. a malware file and a vulnerable clean file) has been reintroduced, which is a sign of it being (intended to be) used by malware. However, in case the file is a driver which is actually used to control hardware of the computer system, it just is an older version, which would be derivable from the installation and/security log information, and this file is then not considered as a malware file or a vulnerable clean file.

After one or more of the above verifications are performed, the result of checking can be derived on the basis of the one or more of the verifications performed, and the method illustrated in FIG. 2 can be terminated.

According to exemplifying embodiments of the present invention, checking result derivation can be accomplished in various ways. Generally speaking, the result of checking may be derived on the basis of one or more of available threat indications for the vulnerable clean file resulting from one or more of performed verifications. Some examples are outlined below.

It is to be noted that the illustration in FIG. 2 is only of exemplary nature and for illustrative purposes, and the present invention is not limited thereto. According to exemplifying embodiments of the present invention, only an arbitrary subset of one or more of the above verifications can be performed, or an arbitrary subset of one or more of the above verifications can be performed in parallel rather than in sequence. For example, a process of checking usage-by-malware threat of a vulnerable clean file according to exemplifying embodiments of the present invention may comprise that only one of the verifications is performed and the final result is derived as the result of this verification only, or the verification operation may be terminated when one verification or a predetermined number or ratio of verifications results in a high threat indication (for example, when the reputation analysis yield low threat due to good and/or trustworthy reputation). Also, the results of more than one verification can be used as a basis for deriving the final result, e.g. using a weighting approach. If so, a weighted value of all or a predefined subset of verification results can be calculated, and the calculated weighted value can be compared with a predetermined value. For example, the result of presence/registration determination may be prioritized over the result of launchpoint/configuration usualness testing in that the result of presence/registration determination is weighted by 0.75 and the result of launchpoint/configuration usualness testing is weighted by 0.25, resulting (assuming a high threat to have a value of 1 and a low threat to have a value of 0) in a weighted value of 0.75, which could be understood as a high threat because of being larger than a potential threshold value of 0.5.

In view of the above, according to exemplifying embodiments of the present invention, the vulnerable clean file can be detected as malware-usable clean file either when at least one verification results in a high threat indication, or when a predetermined number or ratio of verifications results in a high threat indication, or when a weighting operation of threat indications of verifications exceeds a predetermined value.

Figure 3:
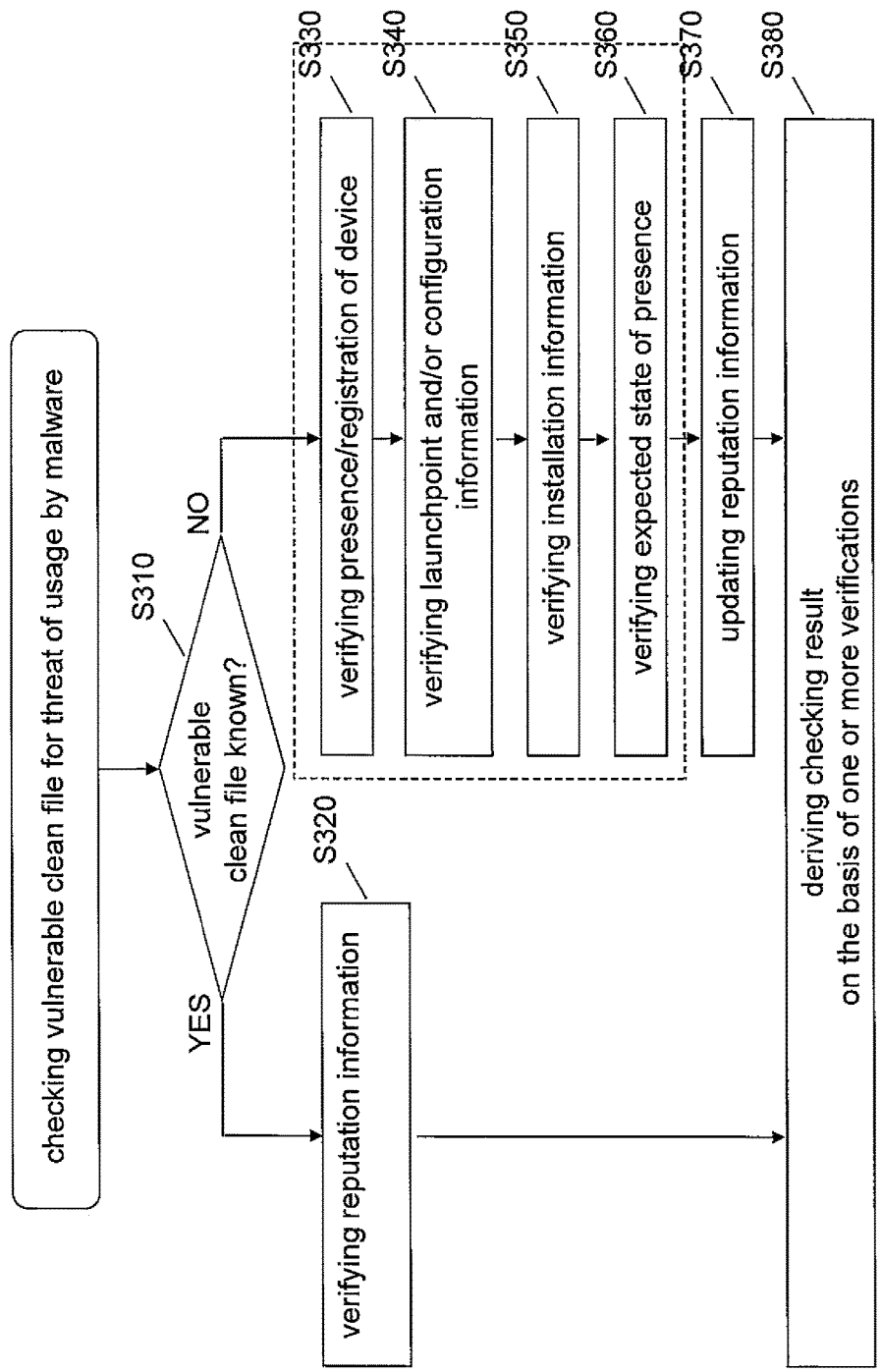
FIG. 3 shows a flowchart illustrating an example of another process of checking usage-by-malware threat of a vulnerable clean file according to exemplifying embodiments of the present invention.

FIG. 3 shows a flowchart illustrating an example of another process of checking usage-by-malware threat of a vulnerable clean file according to exemplifying embodiments of the present invention.

As shown in FIG. 3, another example of a process of checking usage-by-malware threat of a vulnerable clean file according to exemplifying embodiments of the present invention (corresponding to the checking operation in the method illustrated in FIG. 1) comprises an operation (S310) of determining whether not the vulnerable clean file in question is known in the operating system (e.g. using the aforementioned reputation information or reputation information database), operations (S320 to S360) of verifying one or more properties of the vulnerable clean file which could be indicative of its threat of usage by malware (i.e. one or more verifications) depending on this determination, an operation (S370) of updating reputation information of vulnerable clean files known in the computer system, and an operation (S380) of deriving a checking result to be used in the detecting operation in the method illustrated in FIG. 1.

For details on the individual verifications, their potential combinations and the derivation of a final checking result based thereon, reference is made to the detailed description of FIG. 2, which equally applies here accordingly. That is, verifying operations S320 to S360 in FIG. 3 correspond to verifying operations S210a to S210e in FIG. 2, and result deriving operation S380 in FIG. 3 correspond to result deriving operation S220 in FIG. 2, respectively, As shown in FIG. 3, the usage-by-malware threat of a vulnerable clean file can be checked by only using the reputation information thereof, if this file is already known and correspondingly evaluated in terms of its reputation in the computer system. As outlined above, the checking results in (an indication of) a high threat of usage by malware when reputation information indicative of a bad and/or malicious reputation is recognized for the vulnerable clean file under verification, and (an indication of) a low threat of usage by malware when reputation information indicative of a good and/or trustworthy reputation is recognized for the vulnerable clean file under verification.

Otherwise, if the vulnerable clean file in question is not already known or not correspondingly evaluated in terms of its reputation in the computer system, another verification operation (including one or more verifications of S330 to S360) is required. As a result thereof, reputation information of this file can be updated (including preparation and modification thereof), e.g. in a reputation information database, on the basis of a result of the verification operation. Thereby, it is enabled that a subsequent check of usage-by-malware threat of the same file (for example after a predetermined period, upon a subsequent installation attempt thereof, or the like) can easily be accomplished using its reputation information in the verifying operation S320.

Although not shown in FIG. 3, the verification operation (including one or more verifications of S330 to S360) as well as the updating operation S370 can also be performed before or after the verifying operation S320, if the vulnerable clean file in question is already known. Thereby, its status/reputation can be reviewed and, if need be, modified accordingly. Hence, such approach may be adopted for selected instances of this process only, e.g. every x-th execution thereof (x being a natural number larger than 1), either generally or with regard to the same file, after lapse of a predetermined time period since the latest execution thereof, either generally or with regard to the same file, or the like.

By virtue of exemplifying embodiments of the present invention, as described above, detection of a malware-usable clean file or, stated differently, detection of malware using a clean file in a computer system is enabled. Thereby, a vulnerable clean file can be detected as being (likely to be) used by malware. And, hence, threats based on usage of a clean file as malware or, stated differently, malware using a clean file can be detected and prevented.

Even if a clean file cannot be detected as malware as such, exemplifying embodiments of the present invention facilitate to perform a valuable security-related detection on the basis of certain properties of the clean file, which could be indicative of its threat of usage by malware. Stated in other words, such properties could indicate sort of anomaly of the clan file, in the meaning that it has no legitimate business or right to exist, either generally in the computer system or, more specifically, at a specific location in the computer system or under a specific condition. To this, various kinds of information can be used to be queried, which are maintained in the computer system, including e.g. reputation information of known vulnerable clean files such as drivers and ecosystem information about typical clean installations of vulnerable clean files such as drivers.

Accordingly, exemplifying embodiments of the present invention are effective for detecting and thus preventing threats based on an advanced persistent threat (APT) and common malware using a clean file as launch mechanism for itself or for sandbox escape, as described above.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, nodes and systems, including both software and/or hardware thereof.

Respective exemplifying embodiments of the present invention are described below referring to FIG. 4, while for the sake of brevity reference is made to the detailed description of respective corresponding configurations/setups, schemes, methods and functionality, principles and operations according to FIGS. 1 to 3.

Figure 4:
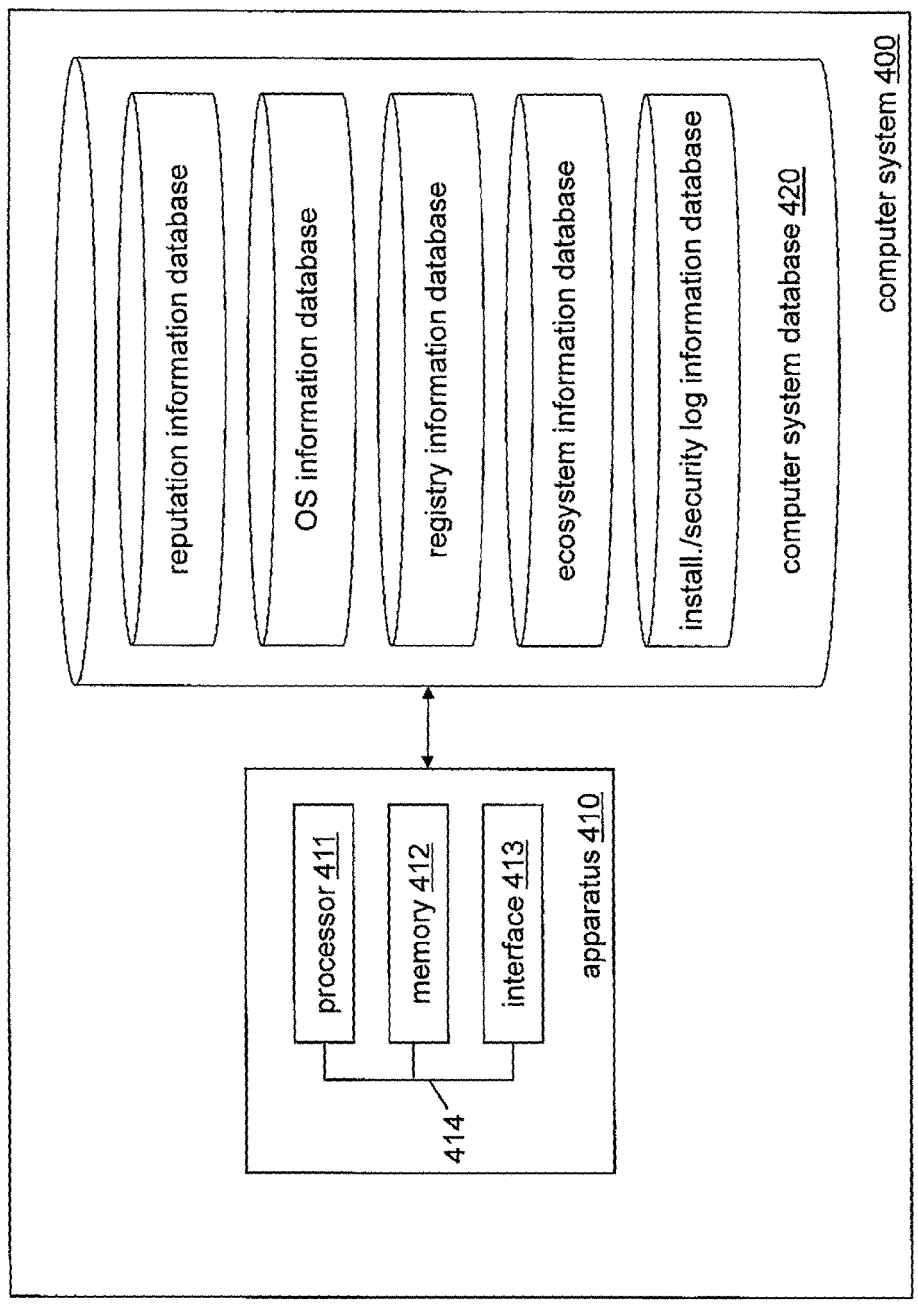
FIG. 4 shows a schematic diagram illustrating an example of a structure of a computer system and an apparatus according to exemplifying embodiments of the present invention.

In FIG. 4, the solid line blocks are basically configured to perform respective methods, procedures and/or functions as described above. The entirety of solid line blocks are basically configured to perform the methods, procedures and/or functions as described above, respectively. With respect to FIG. 4, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIG. 4, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories, a display, or the like. Among others, one or more memories are provided for storing programs or program instructions for controlling or enabling the individual functional entities or any combination thereof to operate as described herein in relation to exemplifying embodiments.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated devices/apparatuses are suitable for use in practicing one or more of the exemplifying embodiments of the present invention, as described herein.

FIG. 4 shows a schematic diagram illustrating an example of a structure of a computer system and an apparatus according to exemplifying embodiments of the present invention.

As indicated in FIG. 4, according to exemplifying embodiments of the present invention a computer system 400 comprises an apparatus 410 and a computer system database 420. It is noted that computer system 400 illustrated in FIG. 4 may be (part of) the target computer system to be secured and/or (part of) a computer system of an external security provider.

The apparatus 410 may comprise at least one processor 411 and at least one memory 412 (and possibly also at least one interface 413), which may be operationally connected or coupled, for example by a bus 414 or the like, respectively.

The processor 411 of the apparatus 410 is configured to read and execute computer program code stored in the memory 412. The processor may be represented by a CPU (Central Processing Unit), a MPU (Micro Processor Unit), etc, or a combination thereof. The memory 412 of the apparatus 410 is configured to store computer program code, such as respective programs, computer/processor-executable instructions, macros or applets, etc. or parts of them. Such computer program code, when executed by the processor 411, enables the apparatus 410 to operate in accordance with exemplifying embodiments of the present invention. The memory 412 may be represented by a RAM (Random Access Memory), a ROM (Read Only Memory), a hard disk, a secondary storage device, etc., or a combination of two or more of theses. The interface 413 of the apparatus 410 is configured to interface with another apparatus and/or the user of the apparatus 410. That is, the interface 413 may represent a communication interface (including e.g. a modern, an antenna, a transmitter, a receiver, a transceiver, or the like) and/or a user interface (such as a display, touch screen, keyboard, mouse, signal light, loudspeaker, or the like).

The computer system database 420 may comprise one or more of a reputation information database, an operating system (OS) information database, a registry or registry information database, an ecosystem information database and an installation/security log information database. For details on the contents of any one of these databases, reference is made to the above description, mainly that of FIG. 2. It is noted that, while being illustrated separately, the computer system database 420 or any one of the thus included databases may also be stored in the memory 412 of the apparatus 410.

The apparatus 410 may be configured to perform a procedure and/or exhibit a functionality as described in any one of FIGS. 1 to 3.

The apparatus 410 or its processor 411 (possibly together with computer program code stored in the memory 412), in its most basic form, is configured to identify a vulnerable clean file in a computer system, which does not constitute malware but is vulnerable for usage by malware, to check the vulnerable clean file for its threat of usage by malware, and to detect the vulnerable clean file as malware-usable clean file on the basis of a result of said checking of its threat of usage by malware.

Accordingly, any one of the above-described schemes, methods, procedures, principles and operations may be realized in a computer-implemented manner.

An apparatus according to exemplifying embodiments of the present invention may be structured by comprising respective units or means for performing corresponding operations, procedures and/or functions. For example, such means may be implemented/realized on the basis of an apparatus structure, as exemplified in FIG. 4 above, i.e. by one or more processors 411, one or more memories 412, one or more interfaces 413, or any combination thereof.

An apparatus according to exemplifying embodiments of the present invention, which represents the (a part of the) system, may comprise (at least) a unit or means for identifying a vulnerable clean file in a computer system, which does not constitute malware but is vulnerable for usage by malware, a unit or means for checking the vulnerable clean file for its threat of usage by malware, and a unit or means for detecting the vulnerable clean file as malware-usable clean file on the basis of a result of said checking of its threat of usage by malware.

For further details regarding the operability/functionality of the individual elements according to exemplifying embodiments of the present invention, reference is made to the above description in connection with any one of FIGS. 1 to 3, respectively.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling the detection of a malware-usable clean file or, stated differently, the detection of malware using a clean file. Such measures could exemplarily comprise identifying a vulnerable clean file in a computer system, which does not constitute malware but is vulnerable for usage by malware, checking the vulnerable clean file for its threat of usage by malware, and detecting the vulnerable clean file as malware-usable clean file on the basis of a result of said checking of its threat of usage by malware.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

The invention claimed is:

1. A method of preventing clean files being used by malware, comprising
identifying a vulnerable clean file in a computer system, which does not constitute malware but is vulnerable for usage by malware by verifying presence and/or registration of a device associated with the vulnerable clean file in the computer system;

checking the vulnerable clean file for its threat of usage by malware;

detecting the vulnerable clean file as malware-usable clean file as a result of detecting that no device associated with the vulnerable clean file is recognized in the computer system based on the presence and/or registration verification of the device associated with the vulnerable clean file; and preventing the detected malware-usable clean file from being used by malware.

2. The method according to claim 1, said checking further comprising:

verifying reputation information of the vulnerable clean file, wherein said checking results in a high threat of usage by malware when information indicative of a bad and/or malicious reputation is recognized.

3. The method according to claim 1:

wherein said verifying the presence and/or registration of a device associated with the vulnerable clean file is performed by querying any one of log, diagnostic and hardware information of an operating system of the computer system, and said checking results in a high threat of usage by malware when no device associated with the vulnerable clean file is recognized.

4. The method according to claim 1, said checking further comprising:

verifying launchpoint and/or configuration information of the vulnerable clean file, wherein said verifying is performed by querying registry information of the computer system and said checking results in a high threat of usage by malware when unusual launchpoint and/or configuration information is recognized.

5. The method according to claim 1, said checking comprising:

verifying installation information of installation of the vulnerable clean file in the computer system, wherein said verifying is performed by querying ecosystem information for file installation in the computer system and said checking results in a high threat of usage by malware when an anomaly in installation information is recognized.

6. The method according to claim 1, said checking comprising:

verifying expected state of presence of the vulnerable clean file in the computer system, wherein said verifying is performed by querying installation and/or security log information for the vulnerable clean file and said checking results in a high threat of usage by malware when a mismatch between an actual state of presence of the vulnerable clean file and a nominal state of presence of the vulnerable clean file is recognized.

7. The method according to claim 1, said identifying comprising:

testing a file for being malware, wherein the file is identified as clean file when said testing results in that the file does not constitute malware, and/or testing a clean file for being vulnerable, wherein the clean file is identified as vulnerable clean file when said testing results in that the clean file is vulnerable for usage by malware.

8. The method according to claim 1, wherein the method is executed either when the vulnerable clean file is being input or installed in the computer system, or upon initiation by a user or process of the computer system, or upon detection of a predefined event or situation, or on a regular basis.

9. An apparatus, comprising a memory device configured to store computer program code, and a processor configured to read and execute computer program code stored in the memory, wherein the processor is configured to cause the apparatus to perform:

identifying a vulnerable clean file in a computer system, which does not constitute malware but is vulnerable for usage by malware;

checking the vulnerable clean file for its threat of usage by malware by verifying presence and/or registration of a device associated with the vulnerable clean file in the computer system;

detecting the vulnerable clean file as malware-usable clean file as a result of detecting that no device associated with the vulnerable clean file is recognized in the computer system based on the presence and/or registration verification of the device associated with the vulnerable clean file; and preventing the detected malware-usable clean file from being used by malware.

10. The apparatus according to claim 9, wherein the processor is configured to cause the apparatus to perform:

verifying reputation information of the vulnerable clean file, wherein said checking results in a high threat of usage by malware when information indicative of a bad and/or malicious reputation is recognized.

11. The apparatus according to claim 10, wherein the result of said checking is derived on the basis of one or more of available threat indications for the vulnerable clean file resulting from one or more of performed verifications.

12. The apparatus according to claim 11, wherein the vulnerable clean file is detected as malware-usable clean file either when at least one verification results in a high threat indication, or when a predetermined number or ratio of verifications results in a high threat indication, or when a weighting operation of threat indications of verifications exceeds a predetermined value.

13. The apparatus according to claim 9, wherein the processor is configured to cause the apparatus to perform:

verifying the presence and/or registration of the device associated with the vulnerable clean file by querying any one of log, diagnostic and hardware information of an operating system of the computer system and said checking results in a high threat of usage by malware when no device associated with the vulnerable clean file is recognized.

14. The apparatus according to claim 9, wherein the processor is configured to cause the apparatus to perform:

verifying launchpoint and/or configuration information of the vulnerable clean file, wherein the processor is configured to cause the apparatus to perform said verifying by querying registry information of the computer system and said checking results in a high threat of usage by malware when unusual launchpoint and/or configuration information is recognized.

15. The apparatus according to claim 9, wherein the processor is configured to cause the apparatus to perform:

verifying installation information of installation of the vulnerable clean file in the computer system, wherein the processor is configured to cause the apparatus to perform said verifying by querying ecosystem information for file installation in the computer system and said checking results in a high threat of usage by malware when an anomaly in installation information is recognized.

16. The apparatus according to claim 9, wherein the processor is configured to cause the apparatus to perform:

verifying expected state of presence of the vulnerable clean file in the computer system, wherein the processor is configured to cause the apparatus to perform said verifying by querying installation and/or security log information for the vulnerable clean file and said checking results in a high threat of usage by malware when a mismatch between an actual state of presence of the vulnerable clean file and a nominal state of presence of the vulnerable clean file is recognized.

17. The apparatus according to claim 9, wherein the processor is configured to cause the apparatus to perform:

testing a file for being malware, wherein the file is identified as clean file when said testing results in that the file does not constitute malware, and/or testing a clean file for being vulnerable, wherein the clean file is identified as vulnerable clean file when said testing results in that the clean file is vulnerable for usage by malware.

18. The apparatus according to claim 9, wherein the processor is configured to cause the apparatus to operate either when the vulnerable clean file is being input or installed in the computer system, or upon initiation by a user or process of the computer system, or upon detection of a predefined event or situation, or on a regular basis.

19. A non-transitory computer storage medium having stored thereon a computer program code executed by at least one processor to perform at least:

identifying a vulnerable clean file in a computer system, which does not constitute malware but is vulnerable for usage by malware by verifying presence and/or registration of a device associated with the vulnerable clean file in the computer system;

checking the vulnerable clean file for its threat of usage by malware;

detecting the vulnerable clean file as malware-usable clean file as a result of detecting that no device associated with the vulnerable clean file is recognized in the computer system based on the presence and/or registration verification of the device associated with the vulnerable clean file; and preventing the detected malware-usable clean file from being used by malware.

* * * * *